United States Patent
Russell et al.

(10) Patent No.: US 11,527,069 B1
(45) Date of Patent: Dec. 13, 2022

(54) POSE ESTIMATION FOR FRAME INTERPOLATION

(71) Applicant: GoPro, Inc., San Mateo, CA (US)

(72) Inventors: Andrew Russell, San Mateo, CA (US); Robert McIntosh, San Mateo, CA (US)

(73) Assignee: GoPro, Inc., San Mateo, CA (US)

( * ) Notice: Subject to any disclaimer, the term of this patent is extended or adjusted under 35 U.S.C. 154(b) by 129 days.

(21) Appl. No.: 17/151,547

(22) Filed: Jan. 18, 2021

(51) Int. Cl.
*G06V 20/40* (2022.01)
*H04N 19/573* (2014.01)
*H04N 19/543* (2014.01)
*G06V 40/20* (2022.01)

(52) U.S. Cl.
CPC .............. *G06V 20/46* (2022.01); *G06V 40/23* (2022.01); *H04N 19/543* (2014.11); *H04N 19/573* (2014.11); *G06V 2201/07* (2022.01)

(58) Field of Classification Search
CPC .... G06V 20/46; G06V 40/23; G06V 2201/07; H04N 19/543; H04N 19/573
USPC .......................................................... 382/103
See application file for complete search history.

(56) References Cited

U.S. PATENT DOCUMENTS

2015/0139505 A1* 5/2015 Vladimirov ............. G06T 7/246
382/107
2021/0133580 A1* 5/2021 Mehl ...................... G06N 7/005

* cited by examiner

*Primary Examiner* — Allen C Wong
(74) *Attorney, Agent, or Firm* — Esplin & Associates, PC

(57) ABSTRACT

Poses of a person depicted within video frame may be determined. The poses of the person may be used to generate intermediate video frames between the video frames.

20 Claims, 6 Drawing Sheets

System 10

POSE ESTIMATION FOR FRAME INTERPOLATION

FIELD

This disclosure relates to interpolating video frames using poses of a person depicted within video frames.

BACKGROUND

Frame interpolation may be used to generate intermediate video frames between video frames captured by an image capture device. Inaccurate frame interpolation may result in unnatural depictions of persons.

SUMMARY

This disclosure relates to interpolating video frames using pose estimation. Video frame information and/or other information may be obtained. The video frame information may define multiple video frames. The multiple video frames may include depictions of a person. The depictions of the person may change between the multiple video frames based on movement of the person during capture of the multiple video frames. The multiple video frames may include a first video frame, a second video frame, and/or other video frames. The first video frame may include a first depiction of the person and the second video frame may include a second depiction of the person. The first depiction of the person may be different from the second depiction of the person. Poses of the person depicted within the multiple video frames may be determined. A first pose of the person may be determined within the first video frame and a second pose of the person may be determined within the second video frame. The first pose of the person may be different from the second pose of the person.

One or more intermediate video frames between pairs of the multiple video frames may be generated based on the poses of the person depicted within the pairs of the multiple video frames and/or other information. A first intermediate video frame may be generated between the first video frame and the second video frame based on the first pose of the person depicted within the first video frame, the second pose of the person depicted within the second video frame, and/or other information. The first intermediate video frame may include a first intermediate depiction of the person.

A system that interpolates video frames using pose estimation may include one or more electronic storage, processor, and/or other components. The electronic storage may store video frame information, information relating to video frames, information relating to depictions of persons, information relating to poses of persons, information relating to generation of intermediate video frames, and/or other information.

The processor(s) may be configured by machine-readable instructions. Executing the machine-readable instructions may cause the processor(s) to facilitate interpolating video frames using pose estimation. The machine-readable instructions may include one or more computer program components. The computer program components may include one or more of a video frame information component, a pose component, a generation component, and/or other computer program components.

The video frame information component may be configured to obtain video frame information and/or other information. The video frame information may define multiple video frames. The multiple video frames may include depictions of a person. The depictions of the person may change between the multiple video frames based on movement of the person during capture of the multiple video frames. The multiple video frames may include a first video frame, a second video frame, and/or other video frames. The first video frame may include a first depiction of the person and the second video frame may include a second depiction of the person. The first depiction of the person may be different from the second depiction of the person.

The pose component may be configured to determine poses of the person depicted within the multiple video frames. A first pose of the person may be determined within the first video frame, and a second pose of the person may be determined within the second video frame. The first pose of the person may be different from the second pose of the person.

The generation component may be configured to generate one or more intermediate video frames between pairs of the multiple video frames. The intermediate video frame(s) between the pairs of the multiple video frames may be generated based on the poses of the person depicted within the pairs of the multiple video frames and/or other information. A first intermediate video frame may be generated between the first video frame and the second video frame. The first intermediate video frame may be generated based on the first pose of the person depicted within the first video frame, the second pose of the person depicted within the second video frame, and/or other information. The first intermediate video frame may include a first intermediate depiction of the person.

In some implementations, the intermediate video frame(s) may be generated further based on motion interpolation.

In some implementations, the first depiction of the person may include a first pixel depicting a part of the person. The first pixel may be located at a first position within the first video frame. The second depiction of the person may include a second pixel depicting the part of the person. The second pixel may be located at a second position different from the first position within the second video frame. The first intermediate depiction of the person may include a first intermediate pixel depicting the part of the person. The first intermediate pixel may be located at a third position different from the first position and the second position within the first intermediate video frame.

In some implementations, generation of the intermediate video frame(s) between the pairs of the multiple video frames based on the poses of the person depicted within the pairs of the multiple video frames may include identification of an interpolation region for the part of the person within the first intermediate video frame. The first intermediate pixel may be allowed to be located within the interpolation region. The first intermediate pixel may not be allowed to be located outside the interpolation region.

In some implementations, estimated movement of the part of the person may be determined based on the first pose of the person depicted within the first video frame, the second pose of the person depicted within the second video frame, and/or other information. Shape of the interpolation region may be determined based on the estimated movement of the part of the person and/or other information.

In some implementations, the shape of the interpolation region may be determined to cover a trajectory of the estimated movement of the part of the person. In some implementations, the trajectory of the estimated movement of the part of the person may be determined based on a joint of the person connected to the part of the person and/or other information. In some implementations, the trajectory of the estimated movement of the part of the person may be determined to include a curved trajectory based on the joint of the person and/or other information. In some implementations, size of the curved trajectory may be determined based on a distance between the part of the person and the joint of the person, and/or other information.

In some implementations, different portions of the interpolation region may be weighted to bias the location of the first intermediate pixel.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

Figure 1:
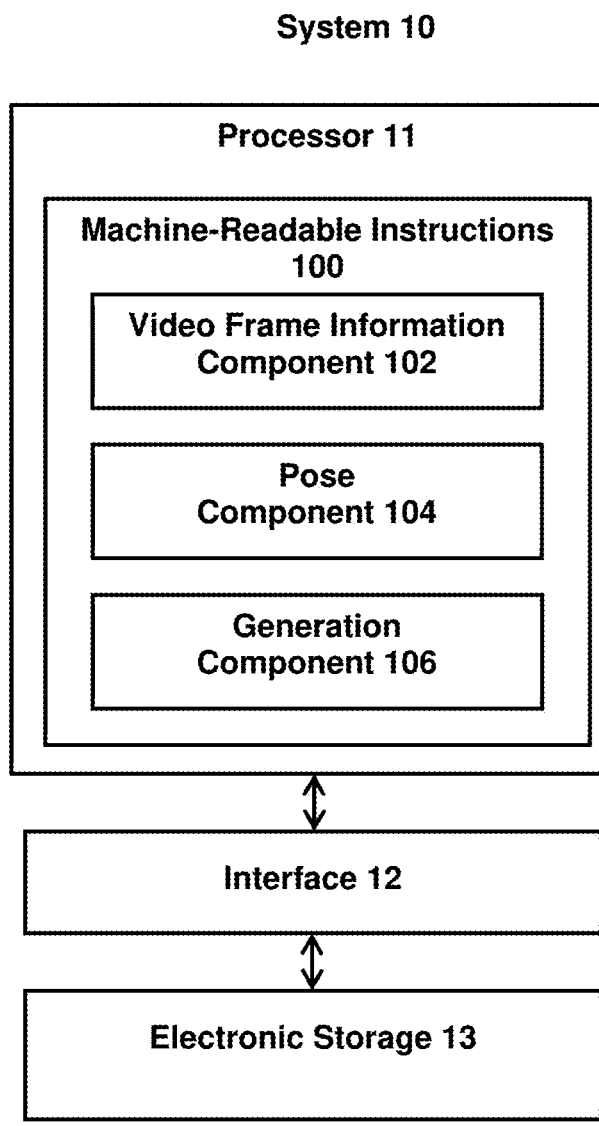
FIG. 1 illustrates a system that interpolates video frames using pose estimation.

FIG. 1 illustrates a system 10 that interpolates video frames using pose estimation. The system 10 may include one or more of a processor 11, an interface 12 (e.g., bus, wireless interface), an electronic storage 13, and/or other components. Video frame information and/or other information may be obtained by the processor 11. The video frame information may define multiple video frames. The multiple video frames may include depictions of a person. The depictions of the person may change between the multiple video frames based on movement of the person during capture of the multiple video frames. The multiple video frames may include a first video frame, a second video frame, and/or other video frames. The first video frame may include a first depiction of the person and the second video frame may include a second depiction of the person. The first depiction of the person may be different from the second depiction of the person. Poses of the person depicted within the multiple video frames may be determined by the processor 11. A first pose of the person may be determined within the first video frame and a second pose of the person may be determined within the second video frame. The first pose of the person may be different from the second pose of the person.

One or more intermediate video frames between pairs of the multiple video frames may be generated by the processor 11 based on the poses of the person depicted within the pairs of the multiple video frames and/or other information. A first intermediate video frame may be generated between the first video frame and the second video frame based on the first pose of the person depicted within the first video frame, the second pose of the person depicted within the second video frame, and/or other information. The first intermediate video frame may include a first intermediate depiction of the person.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store video frame information, information relating to video frames, information relating to depictions of persons, information relating to poses of persons, information relating to generation of intermediate video frames, and/or other information.

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate interpolating video frames using pose estimation. The machine-readable instructions 100 may include one or more computer program components. The machine-readable instructions 100 may include one or more of a video frame information component 102, a pose component 104, a generation component 106, and/or other computer program components.

The video frame information component 102 may be configured to obtain video frame information and/or other information. Obtaining video frame information may include one or more of accessing, acquiring, analyzing, determining, examining, identifying, loading, locating, opening, receiving, retrieving, reviewing, selecting, storing, and/or otherwise obtaining the video frame information. The video frame information component 102 may obtain video frame information from one or more locations. For example, the video frame information component 102 may obtain information from a storage location, such as the electronic storage 13, electronic storage of information and/or signals generated by one or more sensors, electronic storage of a device accessible via a network, and/or other locations. The video frame information component 102 may obtain information from one or more hardware components (e.g., an image sensor) and/or one or more software components (e.g., software running on a computing device).

In some implementations, the video frame information component 102 may obtain video frame information based on user interaction with a user interface/application (e.g., video editing application, video player application), and/or other information. For example, a user interface/application may provide option(s) for a user to generate intermediate video frames between existing video frames. The video frame information defining the video(s) may be obtained based on the user's selection of the video frames/video containing the video frames through the user interface/application. Other selections of video frames for retrieval of video frame information are contemplated.

The video frame information may define multiple video frames. The video frame information may define a video frame by including information that defines one or more content, qualities, attributes, features, and/or other aspects of the video frame. For example, the video frame information may define a video frame by including information that makes up the content of the video frame and/or information that is used to determine the content of the video frame. For instance, the video frame information may include information that makes up and/or is used to determine the arrangement of pixels, characteristics of pixels, values of pixels, and/or other aspects of pixels that define content (visual content) of the video frames. Other types of video frame information are contemplated.

The video frames may include/define visual content of a video. A video frame may include an image of the video at a moment within a progress length of the video. As used herein, term video frame may be used to refer to one or more of an image frame, frame of pixels, encoded frame (e.g., I-frame, P-frame, B-frame), and/or other types of video frame. Video frames may be generated based on light received within a field of view of a single image sensor or within fields of view of multiple image sensors.

The video frame information may be stored in one or more formats and/or one or more containers. A format may refer to one or more ways in which the video frame information is arranged/laid out (e.g., file format). A container may refer to one or more ways in which video frame information is arranged/laid out in association with other information (e.g., wrapper format). Video frame information may be stored within a single file or multiple files. In some implementations, video frame information may be stored within one or more visual tracks of a video.

In some implementations, the video frames may include spherical video frames. The field of view of the spherical video frames may include a spherical field of view. Spherical field of view may include full spherical field of view (360 degrees of capture) or partial spherical field of view (less than 360 degrees of capture).

The video frames may include depictions of one or more persons. For example, the video frames may be captured by an image capture device that includes one or more persons within the field of view of the image capture device. A person may move during capture of the video frames (during capture duration). Depictions of the person may change between the video frames based on the movement of the person during capture of the video frames. That is, due to movement of the person during the capture duration of the video frames, the video frames may include different depictions of the person. The video frames may include depictions of the person in different poses.

Figure 3A:
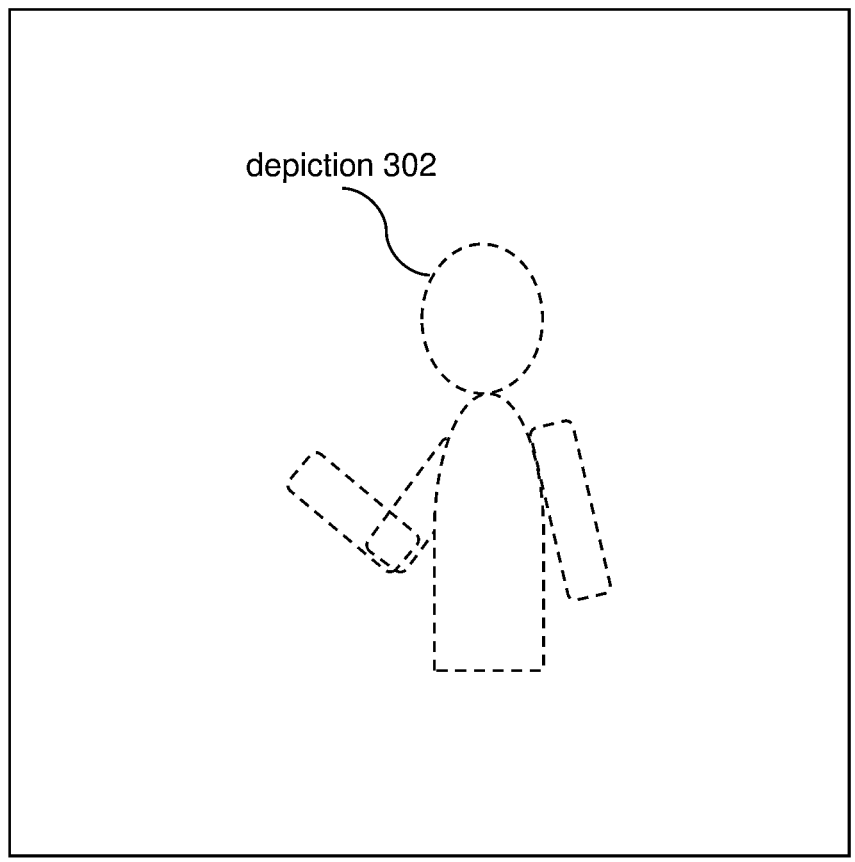
FIGS. 3A and 3B illustrate example video frames.
Figure 3B:
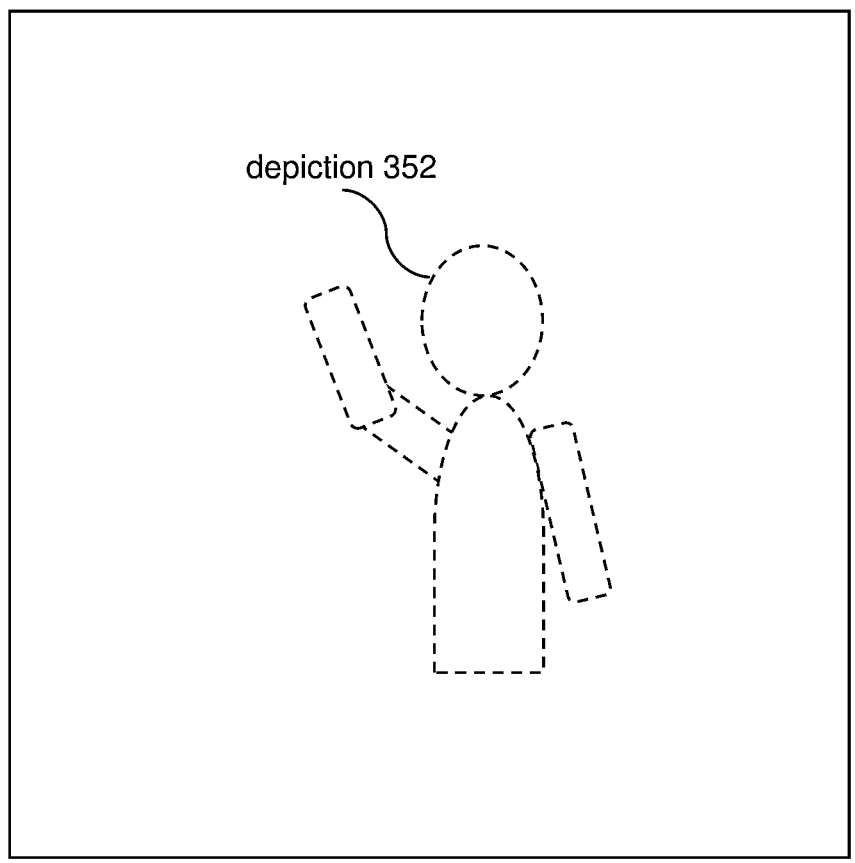

For example, FIGS. 3A and 3B illustrate example video frames. The video frames shown in FIGS. 3A and 3B may have been captured by an image capture device pointed at a person. The person may have moved during capture of the video frames by raising the right hand. The video frames may include different depictions of the person. The video frames may include depictions of the person captured at different moments (points in time, durations of time) within the capture duration of the video frames. For example, in FIG. 3A, a video frame 300 may include a depiction 302 of the person. The depiction 302 may show the person as the person is about to raise the right hand. In FIG. 3B, a video frame 350 may include a depiction 352 of the person. The depiction 352 may be different from the depiction 302. The depiction 352 may show the person with the right hand raised.

The pose component 104 may be configured to determine poses of the person(s) depicted within the multiple video frames. The pose of a person may refer to a way/position in which the body of the person is held. The pose of a person may refer to a way/position in which parts of the body of the person is arranged. The pose of a person may change due to the movement of the person. A change in the pose of a person may include change in position of one or more parts of the person's body.

Determining a pose of a person depicted within a video frame may include ascertaining, choosing, detecting, establishing, finding, identifying, obtaining, selecting, setting, and/or otherwise determining the person of the person depicted within the video frame. A pose of a person depicted within a video frame may be determined based on user selection, analysis of the video frame, and/or other information. User selection of a pose may refer to user input that identifies/designates a particular pose of a person depicted within a video frame. For example, a user may interact with a user interface to select a pose from pose options and/or draw the pose of the person for a particular video frame. Analysis of a video frame may include analysis of the content of the video frame, such as analysis of the arrangement of pixels, characteristics of pixels, values of pixels, and/or other aspects of pixels of the video frame. Analysis of a video frame may include use of computer vision and/or other object detection/recognition techniques to determine the pose of the person depicted within the video frame. In some implementations, the pose of a person depicted within a video frame may be determined further based on the pose(s) of the person within one or more prior video frames and/or one or more subsequent video frames. The pose(s) determined within preceding and/or following video frames may be used limit the pose determination within the video frame. Other determination of the poses of the person(s) depicted within the video frames is contemplated.

For example, different poses of the person may be determined within the video frames 300, 350. The pose of the person depicted within the video frame A 300 may be determined to be a person with right arm bent and raised to middle of the body. The pose of the person depicted within the video frame B 350 may be determined to be a person with right arm raised.

The generation component 106 may be configured to generate one or more intermediate video frames between pairs of the multiple video frames. An intermediate video frame may refer to a video frame that is place in between two other video frames. For a pair of existing video frames (e.g., video frames captured by an image capture device), the generation component 106 may generate one or more intermediate video frames. That is, the generation component 106 may generate one or multiple intermediate video frames for placement between a pair of existing video frames.

Figure 4:
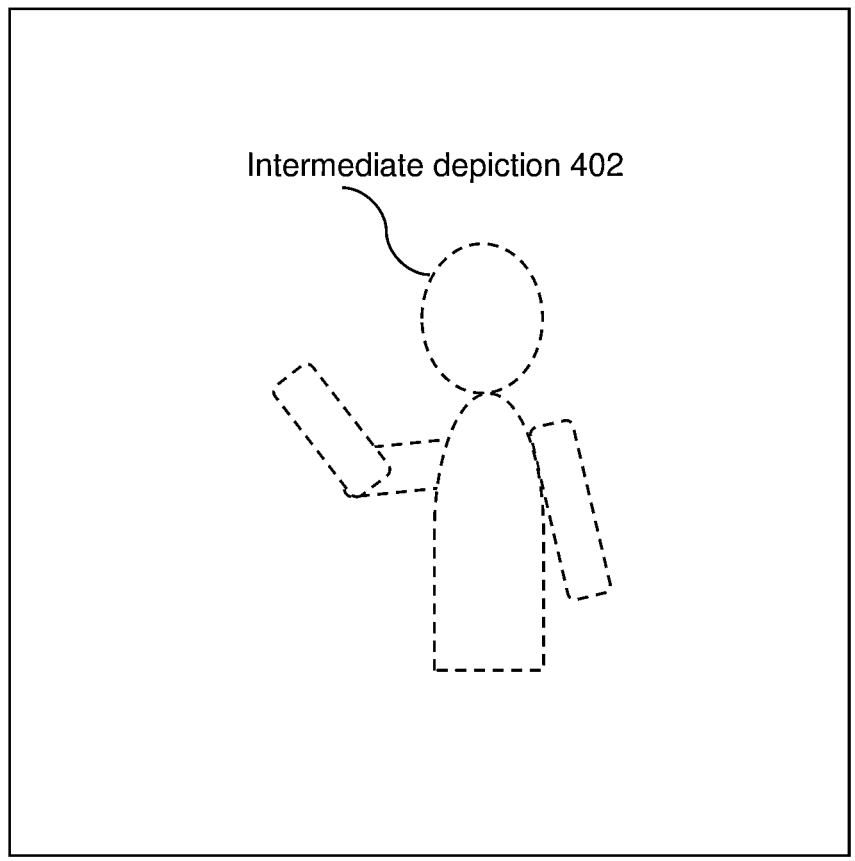
FIG. 4 illustrates an example intermediate video frame.

The intermediate video frame(s) between the pairs of the multiple video frames may be generated based on the poses of the person(s) depicted within the pairs of the multiple video frames and/or other information. The intermediate video frame(s) between a single pair of existing video frames may be generated based on the poses of the person(s) depicted within the pair of existing video frames and/or other information. For example, FIG. 4 illustrates an example intermediate video frame 400. The intermediate video frame 400 may be generated between the video frame A 300 (shown in FIG. 3A) and the video frame B 350 (shown in FIG. 3B). The intermediate video frame 400 may be generated to include an intermediate depiction 402 of the person. The intermediate depiction 402 of the person may be generated based on the depiction of the person within the adjacent/surrounding video frames. That is, the intermediate depiction 402 of the person may be generated based on the depiction 302 of the person in the video frame A 300 and the depiction 352 of the person in the video frame B 350. The intermediate video frame 400 may be generated based on the pose of the person depicted within the video frame A 300, the pose of the person depicted within the video frame B 350, and/or other information.

In some implementations, the intermediate video frame(s) may be generated so that locations of pixels depicting a particular part of the person is determined based on the locations of the pixels within the adjacent/surrounding video frames. The locations of the pixels in the intermediate video frame(s) may be different than the locations of the corresponding pixels in the adjacent/surrounding video frames. For example, referring to FIGS. 3A, 3B, and 4, the location of the pixel depicting the far end of the right hand in the intermediate depiction 402 may be different from the locations of the pixels depicting the far end of the right hand in the depiction 302 and the depiction 352. The location of an intermediate pixel depicting the far end of the right hand in the intermediate depiction 402 may be determined based on the locations of the pixels depicting the far end of the right hand in the depiction 302 and the depiction 352.

In some implementations, the intermediate video frame(s) may be generated further based on motion interpolation. Motion interpolation may include generation of an intermediate depiction using interpolation. Motion interpolation may utilize pixel values of adjacent/surrounding video frames to determine pixel values of the intermediate video frame between the adjacent/surrounding video frames.

The use of the poses in the adjacent/surrounding video frames to determine the depiction of the person in the intermediate video frame may include use of pose estimation in the adjacent/surrounding video frames to estimate the pose of the person in the intermediate video frame. The generation component 106 may utilize skeletal structure of humans to determine/estimate where different body parts should be depicted within the intermediate video frames. The skeletal structure of humans may limit the extent to which a body part my move (e.g., the translational direction/speed of movement, rotational direction/speed of movement).

In some implementations, use of the pose estimation to generate the intermediate video frames may include identification of types of poses depicted within the adjacent/surrounding video frames. Different types of poses/different changes in poses from one type to another may be associated with different movement of body parts. The pose estimation may utilize the types of poses depicted within the adjacent/surrounding video frames and/or the change in poses between the adjacent/surrounding video frames to more accurately determine how the person should be depicted within the intermediate video frames. The pose estimation may utilize locations of joints within a human body to determine likely positions of body parts (e.g., direction and/or amount of translational movement, direction and/or amount of rotational movement) within the intermediate video frames.

In some implementations, use of the pose estimation to generate the intermediate video frames may allow for generation of depictions that would not be possible based on straight interpolation of pixels within the adjacent/surrounding video frames. The use of pose estimation may allow the generation component 106 to determine intermediate depictions that include body positions that extend beyond poses/body positions in the adjacent/surrounding depictions. For example, the adjacent/surrounding video frames may include poses of a person shooting a basketball, with the earlier video frame including depiction of the person with the ball in shooting-ready position (shooting arm bent and in front of the body) and with the later video frame including depiction of the person with the ball having been shot (shooting arm extended forward). Motion interpolation that does not take into account the poses of the person may generate an intermediate video frame in which the arm is positioned between the shooting-ready position and the finished-shooting position. However, the more likely pose between the two poses may be for the shooting arm to have moved upwards in an arc, rather than taking the shortest path between the two poses. Understanding the poses depicted within the adjacent/surrounding depictions may enable the generation component 106 to generate depictions that will correspond to natural movement of humans. The poses within the adjacent/surrounding depictions may enable the generation component 106 to generate depictions that are not mere averages of adjacent/surrounding depictions, but take into account different movements of a person's body.

In some implementations, generation of the intermediate video frame(s) between the pairs of the multiple video frames based on the poses of the person depicted within the pairs of the multiple video frames may include identification of one or more interpolation regions for one or more parts of the person within the intermediate video frame(s). An interpolation region for a part of a person may refer to a part of an intermedia video frame in which an intermediate pixel depicting the part of the person is allowed to be located. The intermediate pixel depicting the part of the person may not be allowed to be located outside the interpolation region. In some implementations, different portions of an interpolation region may be weighted to bias the location of the intermediate pixel. The weighting of the interpolation region may be performed based on the poses of the person depicted within the pairs of the multiple video frames. Different types poses and/or different changes in poses between the adjacent/surrounding video frames may be associated with different weighting of the interpolation region so that intermediate pixels depicting particular body part is biased towards a particular location within the intermediate video frame.

In some implementations, estimated movement of one or more parts of the person may be determined based on the poses of the person depicted within the adjacent/surrounding video frames, and/or other information. For example, estimated movement of the part(s) of the person may be determined based on the pose of the person within the depiction 302/the video frame A 300 and the pose of the person within the depiction 352/the video frame B 350. The shape of the interpolation region for the intermedia video frame 400 may be determined based on the estimated movement of the part(s) of the person and/or other information.

Figure 5:
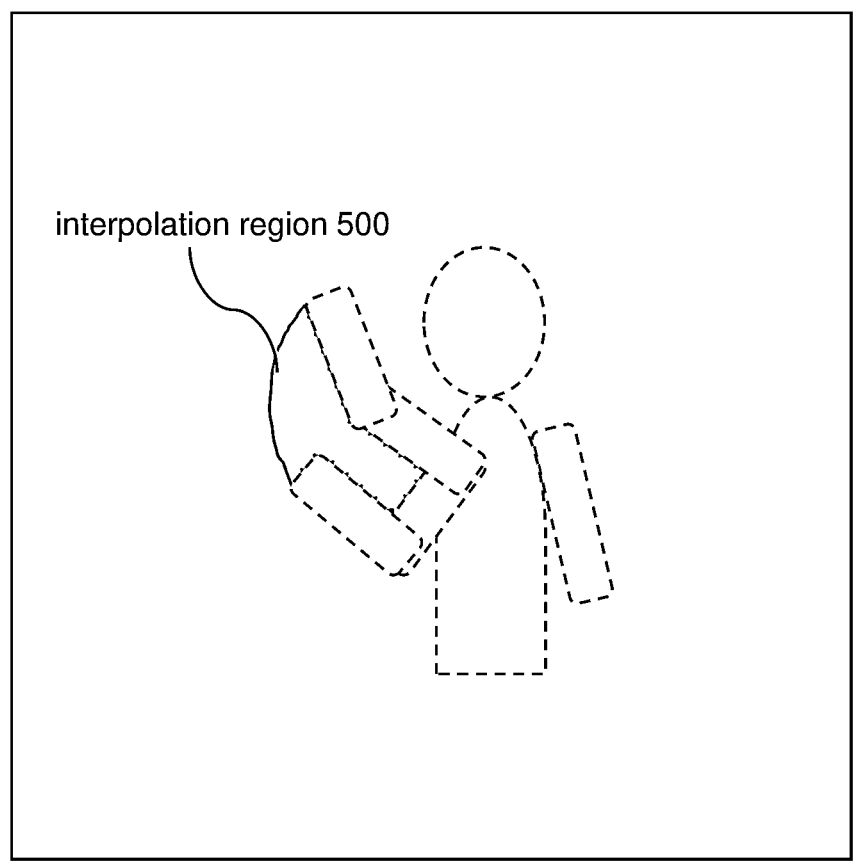
FIG. 5 illustrates an example interpolation region.

FIG. 5 illustrates an example interpolation region 500. The interpolation region 500 may be determined based on the estimated movement of the right arm of the person between the adjacent/surrounding video frames (from right arm bent and raised to middle of the body to raised right arm). The shape of the interpolation region may be determined to cover a trajectory of the estimated movement of the part(s) of the person. The trajectory of the estimated movement of the part(s) of the person may refer to a path or a progression in which the part(s) of the person moves from a preceding depiction/video frame to the following depiction/video frame. For example, in FIG. 5, the interpolation region 500 may cover the trajectory of the estimated movement of the right arm moving from lowered position to raised position.

In some implementations, the trajectory of the estimated movement of the part(s) of the person may be determined based on a joint of the person connected to the part(s) of the person and/or other information. The joint of the person may determine the extent which the part(s) may move. The joint of the person may define limits in movement of the part(s) between the adjacent/surrounding depictions. For example, the trajectory of the estimated movement of the part(s) of the person may be determined to include a curved trajectory based on the joint of the person and/or other information. The part(s) of the person being connected to a joint may require/make it more likely that the part(s) of the person will include rotational movement (rotation about the joint). For instance, the trajectory of the estimated movement of the right arm in FIG. 5 may be determined to include a curved trajectory as the right arm is moved upwards based on the right elbow and/or right shoulder joint of the person.

In some implementations, size of the curved trajectory may be determined based on a distance between the part(s) of the person and the joint of the person, and/or other information. The distance between a part of the person and the joint to which the part is connected may define the extent to which the part may move about the joint. The distance between the part of the person and the joint to which the part is connected may determine the size of the arc that would be traced by the part as the part moves about the joint. For instance, the size of the curved trajectory for the right arm in FIG. 5 may be determined based on distance between the lower end of the upper right arm and the right shoulder joint of the person and/or the distance between the end of the lower right arm (e.g., end of the right hand) and the right elbow of the person.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11 and the electronic storage 13 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which processor 11 comprises multiple processing units, one or more of computer program components may be located remotely from the other computer program components. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
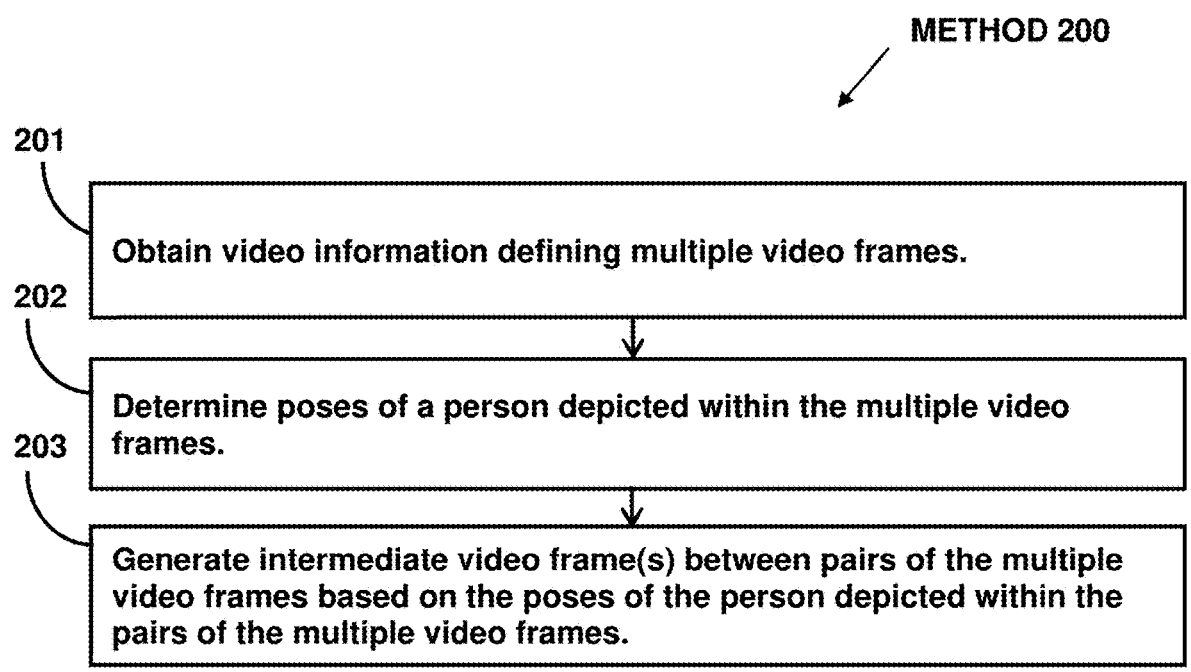
FIG. 2 illustrates a method for interpolating video frames using pose estimation.

FIG. 2 illustrates method 200 for interpolating video frames using pose estimation. The operations of method 200 presented below are intended to be illustrative. In some implementations, method 200 may be accomplished with one or more additional operations not described, and/or without one or more of the operations discussed. In some implementations, two or more of the operations may occur simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage mediums. The one or more processing devices may include one or more devices configured through hardware, firmware, and/or software to be specifically designed for execution of one or more of the operations of method 200.

Referring to FIG. 2 and method 200, at operation 201, video frame information and/or other information may be obtained. The video frame information may define multiple video frames. The multiple video frames may include depictions of a person. The depictions of the person may change between the multiple video frames based on movement of the person during capture of the multiple video frames. The multiple video frames may include a first video frame, a second video frame, and/or other video frames. The first video frame may include a first depiction of the person and the second video frame may include a second depiction of the person. The first depiction of the person may be different from the second depiction of the person. In some implementations, operation 201 may be performed by a processor component the same as or similar to the video frame information component 102 (Shown in FIG. 1 and described herein).

At operation 202, poses of the person depicted within the multiple video frames may be determined. A first pose of the person may be determined within the first video frame and a second pose of the person may be determined within the second video frame. The first pose of the person may be different from the second pose of the person. In some implementations, operation 202 may be performed by a processor component the same as or similar to the pose component 104 (Shown in FIG. 1 and described herein).

At operation 203, one or more intermediate video frames between pairs of the multiple video frames may be generated based on the poses of the person depicted within the pairs of the multiple video frames and/or other information. A first intermediate video frame may be generated between the first video frame and the second video frame based on the first pose of the person depicted within the first video frame, the second pose of the person depicted within the second video frame, and/or other information. The first intermediate video frame may include a first intermediate depiction of the person. In some implementations, operation 203 may be performed by a processor component the same as or similar to the generation component 106 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for interpolating frames using pose estimation, the system comprising: one or more physical processors configured by machine-readable instructions to:
    obtain video frame information defining multiple video frames, the multiple video frames including depictions of a person, the depictions of the person changing between the multiple video frames based on movement of the person during capture of the multiple video frames, wherein the multiple video frames include a first video frame and a second video frame, the first video frame including a first depiction of the person and the second video frame including a second depiction of the person, the first depiction of the person different from the second depiction of the person;
    determine poses of the person depicted within the multiple video frames, wherein a first pose of the person is determined within the first video frame and a second pose of the person is determined within the second video frame, the first pose of the person different from the second pose of the person; and
    generate one or more intermediate video frames between pairs of the multiple video frames based on the poses of the person depicted within the pairs of the multiple video frames, wherein a first intermediate video frame is generated between the first video frame and the second video frame based on the first pose of the person depicted within the first video frame and the second pose of the person depicted within the second video frame, the first intermediate video frame including a first intermediate depiction of the person.

2. The system of claim 1, wherein the one or more intermediate video frames are generated further based on motion interpolation.

3. The system of claim 1 wherein:
    the first depiction of the person includes a first pixel depicting a part of the person, the first pixel located at a first position within the first video frame;
    the second depiction of the person includes a second pixel depicting the part of the person, the second pixel located at a second position different from the first position within the second video frame;
    the first intermediate depiction of the person includes a first intermediate pixel depicting the part of the person, the first intermediate pixel located at a third position different from the first position and the second position within the first intermediate video frame.

4. The system of claim 3, wherein generation of the one or more intermediate video frames between the pairs of the multiple video frames based on the poses of the person depicted within the pairs of the multiple video frames includes identification of an interpolation region for the part of the person within the first intermediate video frame, the first intermediate pixel allowed to be located within the interpolation region and not allowed to be located outside the interpolation region.

5. The system of claim 4, wherein:
estimated movement of the part of the person is determined based on the first pose of the person depicted within the first video frame and the second pose of the person depicted within the second video frame; and
shape of the interpolation region is determined based on the estimated movement of the part of the person.

6. The system of claim 5, wherein the shape of the interpolation region is determined to cover a trajectory of the estimated movement of the part of the person.

7. The system of claim 6, wherein the trajectory of the estimated movement of the part of the person is determined based on a joint of the person connected to the part of the person.

8. The system of claim 7, wherein the trajectory of the estimated movement of the part of the person is determined to include a curved trajectory based on the joint of the person.

9. The system of claim 8, wherein size of the curved trajectory is determined based on a distance between the part of the person and the joint of the person.

10. The system of claim 9, wherein different portions of the interpolation region are weighted to bias the location of the first intermediate pixel.

11. A method for interpolating frames using pose estimation, the method performed by a computing system including one or more processors, the method comprising:
obtaining, by the computing system, video frame information defining multiple video frames, the multiple video frames including depictions of a person, the depictions of the person changing between the multiple video frames based on movement of the person during capture of the multiple video frames, wherein the multiple video frames include a first video frame and a second video frame, the first video frame including a first depiction of the person and the second video frame including a second depiction of the person, the first depiction of the person different from the second depiction of the person;
determining, by the computing system, poses of the person depicted within the multiple video frames, wherein a first pose of the person is determined within the first video frame and a second pose of the person is determined within the second video frame, the first pose of the person different from the second pose of the person; and
generating, by the computing system, one or more intermediate video frames between pairs of the multiple video frames based on the poses of the person depicted within the pairs of the multiple video frames, wherein a first intermediate video frame is generated between the first video frame and the second video frame based on the first pose of the person depicted within the first video frame and the second pose of the person depicted within the second video frame, the first intermediate video frame including a first intermediate depiction of the person.

12. The method of claim 11, wherein the one or more intermediate video frames are generated further based on motion interpolation.

13. The method of claim 11 wherein:
the first depiction of the person includes a first pixel depicting a part of the person, the first pixel located at a first position within the first video frame;
the second depiction of the person includes a second pixel depicting the part of the person, the second pixel located at a second position different from the first position within the second video frame;
the first intermediate depiction of the person includes a first intermediate pixel depicting the part of the person, the first intermediate pixel located at a third position different from the first position and the second position within the first intermediate video frame.

14. The method of claim 13, wherein generating the one or more intermediate video frames between the pairs of the multiple video frames based on the poses of the person depicted within the pairs of the multiple video frames includes identifying an interpolation region for the part of the person within the first intermediate video frame, the first intermediate pixel allowed to be located within the interpolation region and not allowed to be located outside the interpolation region.

15. The method of claim 14, wherein:
estimated movement of the part of the person is determined based on the first pose of the person depicted within the first video frame and the second pose of the person depicted within the second video frame; and
shape of the interpolation region is determined based on the estimated movement of the part of the person.

16. The method of claim 15, wherein the shape of the interpolation region is determined to cover a trajectory of the estimated movement of the part of the person.

17. The method of claim 16, wherein the trajectory of the estimated movement of the part of the person is determined based on a joint of the person connected to the part of the person.

18. The method of claim 17, wherein the trajectory of the estimated movement of the part of the person is determined to include a curved trajectory based on the joint of the person.

19. The method of claim 18, wherein size of the curved trajectory is determined based on a distance between the part of the person and the joint of the person.

20. The method of claim 19, wherein different portions of the interpolation region are weighted to bias the location of the first intermediate pixel.

* * * * *